US009686558B2

(12) United States Patent
Le Leannec et al.

(10) Patent No.: US 9,686,558 B2
(45) Date of Patent: Jun. 20, 2017

(54) SCALABLE ENCODING AND DECODING

(71) Applicant: CANON KABUSHIKI KAISHA, Tokyo (JP)

(72) Inventors: Fabrice Le Leannec, Mouaze (FR); Sébastien Lasserre, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 14/397,096

(22) PCT Filed: Apr. 26, 2013

(86) PCT No.: PCT/EP2013/058771
§ 371 (c)(1),
(2) Date: Oct. 24, 2014

(87) PCT Pub. No.: WO2013/160460
PCT Pub. Date: Oct. 31, 2013

(65) Prior Publication Data

US 2015/0103899 A1 Apr. 16, 2015

(30) Foreign Application Priority Data

Apr. 27, 2012 (GB) .................................. 1207314.4

(51) Int. Cl.
*H04N 19/30* (2014.01)
*H04N 19/34* (2014.01)
(Continued)

(52) U.S. Cl.
CPC ........... *H04N 19/30* (2014.11); *H04N 19/119* (2014.11); *H04N 19/157* (2014.11);
(Continued)

(58) Field of Classification Search
CPC ......... H04N 19/30; H04N 19/33; H04N 19/34
See application file for complete search history.

(56) References Cited

U.S. PATENT DOCUMENTS 5,818,531 A * 10/1998 Yamaguchi ............... G06T 3/40 375/240.2
6,493,387 B1 * 12/2002 Shin .......................... G06T 9/20 375/240.1

(Continued)

FOREIGN PATENT DOCUMENTS

WO 2007/128706 A2 11/2007
WO 2009/054920 A2 4/2009

OTHER PUBLICATIONS

Zhang et al., "CE6.b: Rectangular (2NxN and Nx2N) PU for Intra Prediction", Joint Collaborative Team on Video Coding (JCT-VC) of ITU-T SG16 WP3 and ISO/IEC JTC1/SC29/WG11 8th Meeting: San Jose, Feb 1-10, 2012, Document: JCTVC-H0437 WG11 No. m23313, pp. 1-8.

(Continued)

*Primary Examiner* — Robert Hance
(74) *Attorney, Agent, or Firm* — Canon USA, Inc. I.P. Division

(57) ABSTRACT

A method for scalable encoding of a digital image into a base layer and at least one enhancement layer comprising an up-sampling step providing at least one part of an enhancement layer, based on a corresponding part of a lower layer having a lower level than the considered enhancement layer, the area of said corresponding parts having a scale factor of $4^p$ ($p \geq 1$), the lower layer comprising at least one Largest Coding Unit divisible into Q smaller Coding Units, said units being further divisible into K Prediction Units called lower Prediction Units. For a Largest Coding Unit of said lower layer not divided into smaller Coding Units, and having Prediction Units of different sizes, the corresponding portion of said enhancement layer, is divided into K subdivisions having substantially equivalent proportions as the Prediction Units of different sizes.

19 Claims, 12 Drawing Sheets

80 81 84 85 83 82
2 2 3 3 3 3 2
1 1 2 3 3 3 3 1 2 2

(51) Int. Cl.

| | |
|---|---|
| ***H04N 19/176*** | (2014.01) |
| ***H04N 19/119*** | (2014.01) |
| ***H04N 19/157*** | (2014.01) |
| ***H04N 19/187*** | (2014.01) |
| ***H04N 19/33*** | (2014.01) |
| ***H04N 19/50*** | (2014.01) |

(52) U.S. Cl.

CPC ......... *H04N 19/176* (2014.11); *H04N 19/187* (2014.11); *H04N 19/33* (2014.11); *H04N 19/34* (2014.11); *H04N 19/50* (2014.11)

(56) References Cited

U.S. PATENT DOCUMENTS 6,510,177 B1* 1/2003 De Bonet .............. H04N 19/52 375/240.1
2006/0088101 A1* 4/2006 Han ....................... H04N 19/51 375/240.16
2009/0028245 A1 1/2009 Vieron et al.
2013/0156099 A1* 6/2013 Sasai .................... H04N 19/176 375/240.03
2015/0049806 A1* 2/2015 Choi .................... H04N 19/597 375/240.12
2015/0071356 A1* 3/2015 Kim ..................... H04N 19/513 375/240.16

OTHER PUBLICATIONS

Zheng et al., "Implicit TU split process for asymmetric partitions", Joint Collaborative Team on Video Coding (JCT-VC) of ITU-T SG16 WP3 and ISO/IEC JTC1/SC29/WG11 9th Meeting: Geneva, CH, Apr. 27-May 7, 2012, Document: JCTVC-10308, pp. 1-5.

Ebrahimi, "A quick overview of HEVC", <URL:http://www.videosense.eu/index.php?option=com_phocadownloadd&view=category&download=15:hevc4videosense&id=II:teaching-material&Itemid=58> [retrieved on Jul. 22, 2013], Dec. 16, 2011, pp. 1-61.

* cited by examiner

SCALABLE ENCODING AND DECODING

CROSS-REFERENCE TO RELATED APPLICATIONS

The application is the National Phase application of PCT Application No. PCT/EP2013/058771, filed on Apr. 26, 2013 and titled "Scalable encoding and decoding". This application claims the benefit under 35 U.S.C. §119(a)-(d) of United Kingdom Patent Application No. 1207314.4, filed on Apr. 27, 2012 and titled "Scaleable encoding and decoding". The above cited patent applications are incorporated herein by reference in their entirety.

The present invention concerns the field of scalable video coding, in particular scalable video coding applicable to the High Efficiency Video Coding (HEVC) standard. The invention concerns a method, device computer program, and information storage means for encoding and decoding an image comprising blocks of pixels, said image being comprised e.g. in a digital video sequence.

Video coding is a way of transforming a series of video images into a compact digitized bitstream so that the video images can be transmitted or stored. An encoding device is used to code the video images, with an associated decoding device being available to reconstruct the bitstream for display and viewing. A general aim is to form the bitstream so as to be of smaller size than the original video information. This advantageously reduces the capacity required of a transfer network, or storage device, to transmit or store the coded bitstream.

Common standardized approaches have been adopted for the format and method of the coding process, especially with respect to the decoding part. One of the more recent agreements is Scalable Video Coding (SVC) wherein the video image is split into smaller sections (called macroblocks or blocks) and treated as being comprised of hierarchical layers.

The hierarchical layers include a base layer and one or more enhancement layers (also known as refinement layers). SVC is the scalable extension of the H.264/AVC video compression standard. A further video standard being standardized is HEVC, wherein the macroblocks are replaced by so-called Coding Units and are partitioned and adjusted according to the characteristics of the original image segment under consideration.

The video images may be processed by coding each smaller section individually, in a manner resembling the digital coding of still images or pictures. Alternative models allow for prediction of the features in one frame, either from neighbouring portion, or by association with a similar portion in a neighbouring frame, or from one lower layer to an upper layer (called "inter-layer prediction"). This allows use of already available coded information, thereby reducing the amount of coding bit-rate needed overall.

Differences between the source area and the area used for prediction are captured in a residual set of values which themselves are encoded in association with code for the source area. Effective coding chooses the best model to provide image quality upon decoding, while taking account of the bitstream size each model requires to represent an image in the bitstream. A trade-off between the decoded picture quality and reduction in required number of bits or bit rate, also known as compression of the data, will typically need to be considered.

As mentioned above, one application of the invention is the design of the scalable extension of HEVC (spatial and quality scalability). HEVC scalable extension will allow coding/decoding a video made of multiple scalability layers. These layers comprise a base layer that is compliant with standards such as HEVC, H.264/AVC or MPEG2, and one or more enhancement layers, coded according to the future scalable extension of HEVC.

It is known that to ensure good scalable compression efficiency, it is advantageous to exploit redundancy that lies between the base layer and the enhancement layer, through so-called inter-layer prediction techniques.

At the encoder side, a base layer is first built from an input video. Then one or more enhancement layers are constructed in conjunction with the base layer. Usually, the reconstruction step comprises:

upsampling the base layer, and deriving the prediction information from the base layer to get the prediction information for the enhancement layers.

The base layer is typically divided into Largest Coding Units, themselves divided into Coding Units. The segmentation of the Largest Coding Units is performed according to a well-known Quadtree representation. According to this representation, each Largest Coding Unit may be split into one, four, or more Coding Units, the maximum splitting level (or depth) being predefined.

Each Coding Unit may itself be segmented into one or more Prediction Units, according to different pre-defined patterns. Prediction information is associated to each Prediction Unit. The pattern associated to the Prediction Unit influences the value of the corresponding prediction information.

To derive the enhancement layer's prediction information, the Prediction Units of the base layer can be upsampled. For instance, one known technique is to reproduce the Prediction Unit's pattern used for the base layer at the enhancement layer. The prediction information associated to the base layer's Prediction Units is upsampled in the same way, according to the pattern used.

The inventors have recognized that the motion information obtained when up-sampling the base layer prediction information as in known approaches sometimes has little correlation with the motion actually contained in the original video sequence. In particular, this was observed when:

the pattern used for the base layer's Prediction Units was asymmetric, implying Prediction units with different sizes inside one Coding Unit, and the considered Coding Unit has the same size as the Largest Coding Unit in which it is included (in other words the base layer's Largest Coding Unit was not divided into smaller coding units).

It is an object of the present invention to provide improved scalable encoding, and therefore certain embodiments of the invention aim to overcome or ameliorate the foregoing concerns.

According to a first aspect of the invention there is provided a method for scalable encoding of a digital image into a base layer and at least one enhancement layer comprising an up-sampling step providing at least one part of an enhancement layer, based on a corresponding part of a lower layer having a lower level than the considered enhancement layer, the area of said corresponding parts having a scale factor of $4^p$ ($p \geq 1$), the lower layer comprising at least one Largest Coding Unit divisible into Q smaller Coding Units, said units being further divisible into K lower Prediction Units, wherein, for a Largest Coding Unit of said lower layer not divided into smaller Coding Units, and having lower Prediction Units of different sizes, the corresponding portion of said enhancement layer, is divided into K subdivisions having substantially equivalent proportions as the lower Prediction Units of different sizes.

In this way, embodiments of the present invention allow a block division structure of the enhancement layer, more accurately to reflect the proportions of the structure of the equivalent portion of the lower layer, which may be the base layer.

According to embodiments of this aspect of the invention, the enhancement layer and the lower layer have different resolutions, which is to say that an equivalent picture content area in the enhancement layer will be larger, and contain more pixels than in the lower layer, which might typically be the base layer. Therefore, in embodiments, corresponding or collocated image areas can be identified, and upscaling can be performed for deriving a block structure of the upper layer, based on information from a prior assigned block structure of the lower layer. In addition, prediction information contained within the lower layer, which may be related to the block structure, can also be used to derive prediction information for the corresponding or collocated upper or enhancement layer.

A Largest Coding Unit (LCU) will be understood, in appropriate embodiments, to the be the largest size of coding unit supported by a given encoding scheme of the base layer, and might typically be 64×64 pixels in size for HEVC example. Each LCU of the base layer may be subdivided, in a hierarchical or quadtree fashion for example, providing a block structure having variable block sizes. Some LCUs may not be subdivided, and such LCUs may be said to have a depth of 0, or equivalently be divided into 1 smaller coding unit (Q=1). Each coding unit, which may be a smaller subdivided coding unit or an LCU, is further divisible into Prediction units. Coding units are typically divided into two prediction units, or assigned a single, unitary prediction unit (ie no division—the prediction unit is the same size as the coding unit). In cases where division is into two prediction units per coding unit, such prediction units may be substantially equal in size resulting in a symmetric coding unit, or unequal resulting in an asymmetric coding unit. A coding unit having a unitary prediction unit is considered symmetrical.

The portion of said enhancement layer corresponding to an LCU in the lower layer comprises more than one coding unit in embodiments. This may arise where the enhancement layer has a maximum allowable size of coding unit, and this maximum size may be the same size as the LCU of the lower layer measured in terms of absolute numbers of pixels for example, even if it corresponds to a region of image content of a different size. If the LCU of the lower layer for a given picture area is divided into smaller coding units according to a prior assigned block scheme, an exact correspondence between an LCU of the enhancement layer and a CU of the lower layer may result for that image area. However in certain embodiments, a (largest allowable) coding unit in the enhancement layer for a given picture area may correspond only to a fraction of the smallest available coding unit of a prior assigned block structure of the lower layer.

In preferred embodiments, when an LCU of depth 0 of the lower layer has prediction units of different sizes (asymmetric), each coding unit of said corresponding portion in the enhancement layer is either divided into prediction units of substantially equal size, or assigned a unitary prediction unit. Thus in such embodiments, symmetric coding units result from upscaling of asymmetric coding units.

Preferably, the K subdivisions may have the same orientation as the corresponding lower Prediction Units of different sizes.

According to one embodiment, the enhancement layer portion is divided into enhancement layer's Largest Coding Units, called enhancement Largest Coding Units, themselves being divided into one or several Prediction Units called enhancement Prediction Units and when the considered lower layer's Largest Coding Unit comprises only one smaller Coding Unit including lower Prediction Units having different sizes, then the enhancement Prediction Units based on a corresponding lower Prediction Unit, have substantially equivalent sizes and are arranged to form the enhancement layer portion's K subdivisions.

According to one embodiment, the lower and the enhancement Prediction Units may have a pre-defined type. Such type is typically selected from a set of predefined types, which may be set according to a particular encoding scheme or standard. In this case, at least a part of the enhancement Prediction Units may have a different type from the corresponding lower Prediction Units.

In one embodiment, when the considered lower layer's Largest Coding Unit comprises only one smaller Coding Unit including lower Prediction Units having the same size, then the enhancement Prediction Units based on a corresponding lower Prediction Unit of the collocated lower layer part, have substantially equivalent sizes.

In one embodiment, when the considered lower layer's Largest Coding Unit comprises at least two smaller Coding Units then the enhancement Prediction Units have the same type as the corresponding lower Prediction Units.

In one embodiment, for each enhancement Largest Coding Unit, the upsampling step may further comprise

- determining a corresponding area (baseCUs) within the lower layer part to the considered enhancement Largest Coding Units, said corresponding area being a factor $4^p$ smaller than the considered enhancement Largest Coding Unit,
- finding all the lower layer's Coding Units, called sub-Coding Units (subCU), included in said corresponding area of the collocated lower layer part,
- for each sub-Coding Units (subCU), determining an up-sampled Coding Unit (enhCU) within the considered enhancement layer part, each up-sampled Coding Unit being included in an enhancement Largest Coding Unit and comprising enhancement Prediction Units,
- for each upsampled Coding Unit (enhCU), determining its enhancement Prediction Units, and
- for each enhancement Prediction Unit of the up-sampled Coding Units (enhCU) deriving the prediction information from the corresponding lower Prediction Unit within considered the sub-Coding Unit (subCU).

In one embodiment, determining an up-sampled Coding Unit (enhCU) within the considered enhancement layer further may comprise

- finding the position of the up-sampled Coding Unit (enhCU) within the considered corresponding portion of the enhancement layer, and
- determining the size of the up-sampled Coding Unit based on the size of the corresponding sub-Coding Unit within the collocated lower layer part.

According to an embodiment, determining the enhancement Prediction Units of an up-sampled Coding Unit comprises 1) if the sub-Coding Unit corresponding to the considered up-sampled Coding Unit has a different size than the lower Largest Coding Unit in which it is included, then the enhancement Prediction Units have the same type as the corresponding lower Prediction Unit, 2) else if the sub-Coding Unit corresponding to the considered up-sampled Coding Unit has the same size as the lower Largest Coding Unit in which it is included, it is called sub-Largest Coding Unit and
   a) If the sub-Coding Unit has Predictions Units having substantially equal size or unitary Prediction Unit, then all the corresponding enhancement Largest Coding Units are assigned enhancement Prediction Units with a substantially square shape having the same size,
   b) Else if the sub-Coding Unit has Prediction Units having different sizes, then at least one corresponding enhancement Largest Coding unit is divided into enhancement Prediction Units with a rectangular shape having substantially equal sizes.

In one embodiment, in the case 2a) the corresponding enhancement Largest Coding Units may be assigned a unitary enhancement Prediction Unit. In another embodiment, in the case 2a) the corresponding enhancement Largest Coding Units may be assigned four enhancement Prediction Units with equal size.

In one embodiment, the method further may comprise for each enhancement Prediction Unit, deriving prediction information from prediction information of the corresponding lower Prediction Unit.

According to another aspect of the invention, there is proposed a method for scalable decoding a digital encoded image into a base layer and at least one enhancement layer comprising an up-sampling step providing at least one part of an enhancement layer, based on a corresponding part of a lower layer having a lower level than the considered enhancement layer, the area of said corresponding parts having a scale factor of $4^p$ ($p \geq 1$), the lower layer comprising at least one Largest Coding Unit divisible into Q smaller Coding Units, said units being further divisible into K lower Prediction Units, wherein, for a Largest Coding Unit of said lower layer not divided into smaller Coding Units, and having lower Prediction Units of different sizes, the corresponding portion of said enhancement layer, is divided into K subdivisions having substantially equivalent proportions as the lower Prediction Units of different sizes.

According to another aspect of the invention, there is proposed an encoding device for scalable encoding of a digital image into a base layer and at least one enhancement layer comprising up-sampling means configured to provide at least one part of an enhancement layer, based on a corresponding part of a lower layer having a lower level than the considered enhancement layer, the area of said corresponding parts having a scale factor of $4^p$ ($p \geq 1$), the lower layer comprising at least one Largest Coding Unit divisible into Q smaller Coding Units, said units being further divisible into K Prediction Units, the up-sampling means comprise means for dividing into K subdivisions the corresponding portion of said enhancement layer, when a Largest Coding Unit of said lower layer is not divided into smaller Coding Units, and having lower Prediction Units of different sizes, said K subdivisions having substantially equivalent proportions as the lower Prediction Units of different sizes.

According to another aspect of the invention, there is proposed a decoding device for scalable decoding of an encoded digital image into a base layer and at least one enhancement layer, said device comprising up-sampling means configured to provide at least one part of an enhancement layer, based on a corresponding part of a lower layer having a lower level than the considered enhancement layer, the area of said corresponding parts having a scale factor of $4^p$ ($p \geq 1$), the lower layer comprising at least one Largest Coding Unit divisible into Q smaller Coding Units, said units being further divisible into K Prediction Units, the up-sampling means comprise means for dividing into K subdivisions the corresponding portion of said enhancement layer, when a Largest Coding Unit of said lower layer is not divided into smaller Coding Units, and having lower Prediction Units of different sizes, said K subdivisions having substantially equivalent proportions as the lower Prediction Units of different sizes.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings. Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which.

Figures 9A, 9B, 9C:
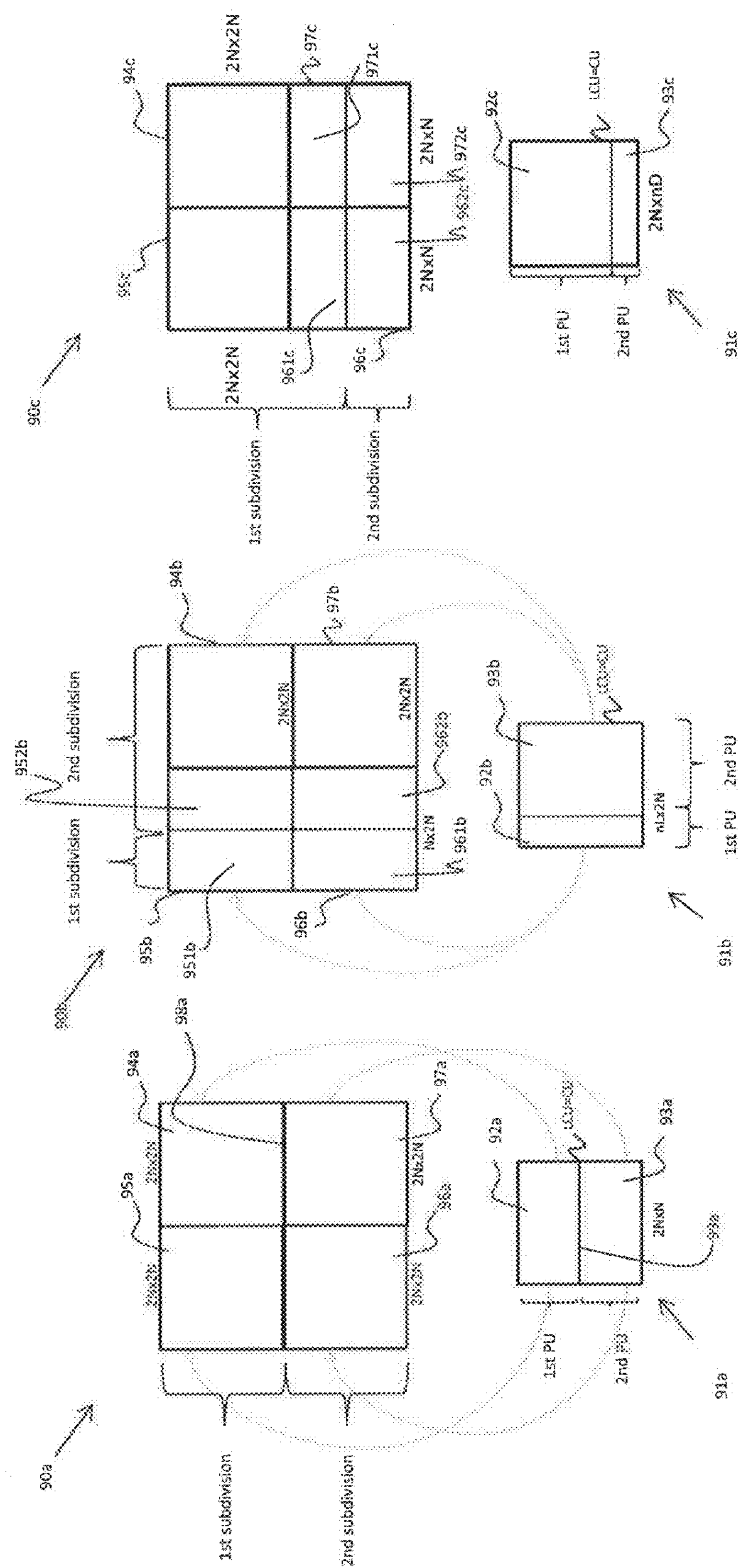

FIGS. 9*a*, 9*b* and 9*c* illustrate the upsampling of a Largest Coding Unit from the base layer to an enhancement layer according to the invention.

Figure 10:
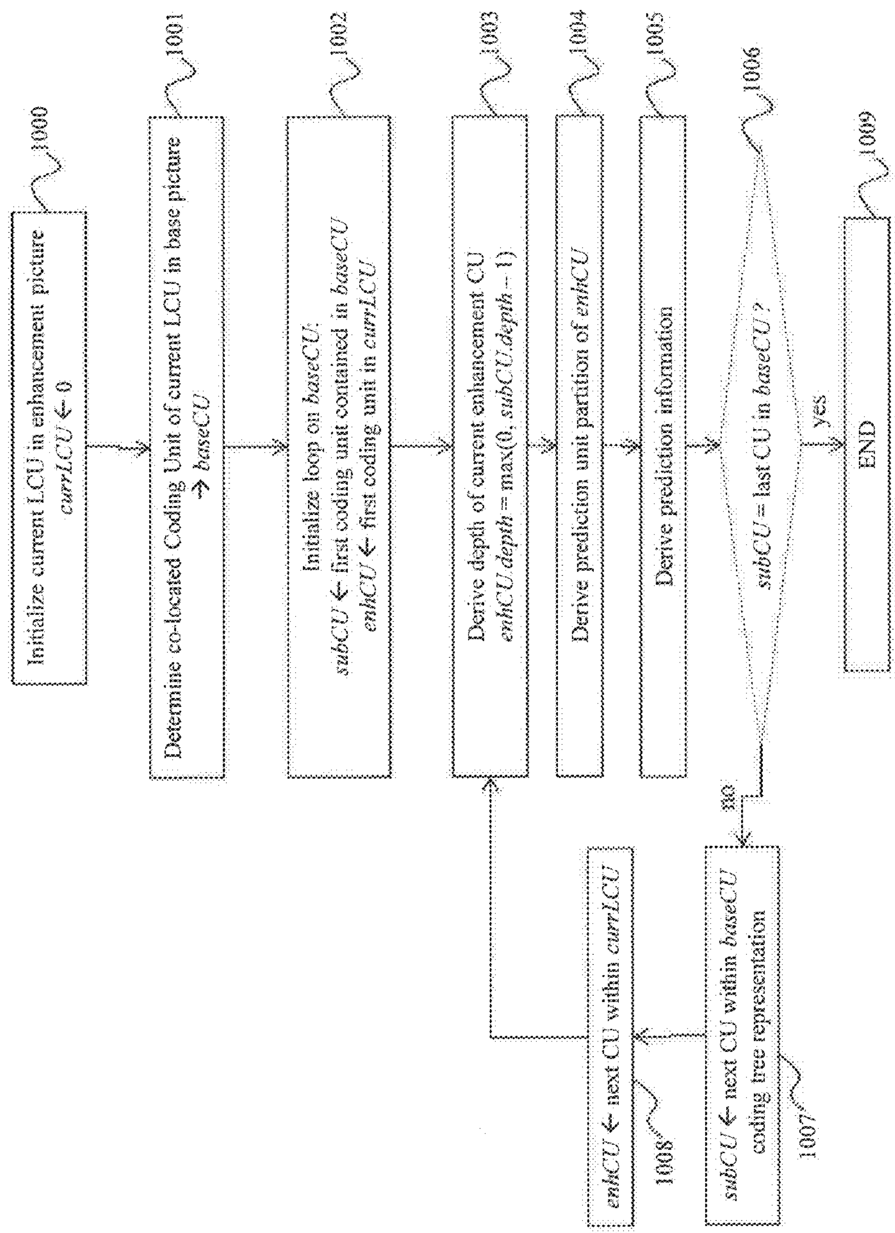
Figure 11:
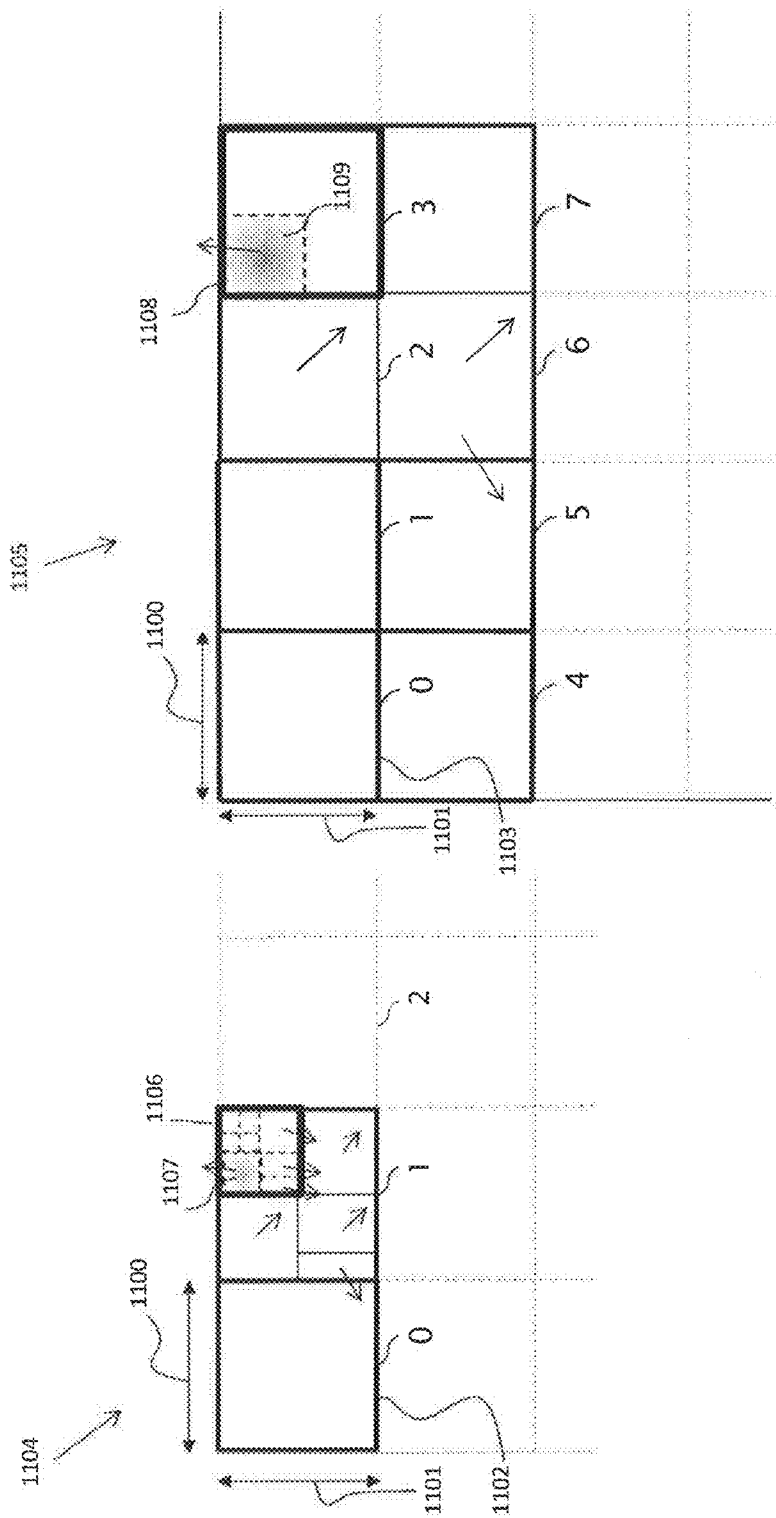
Figure 12:
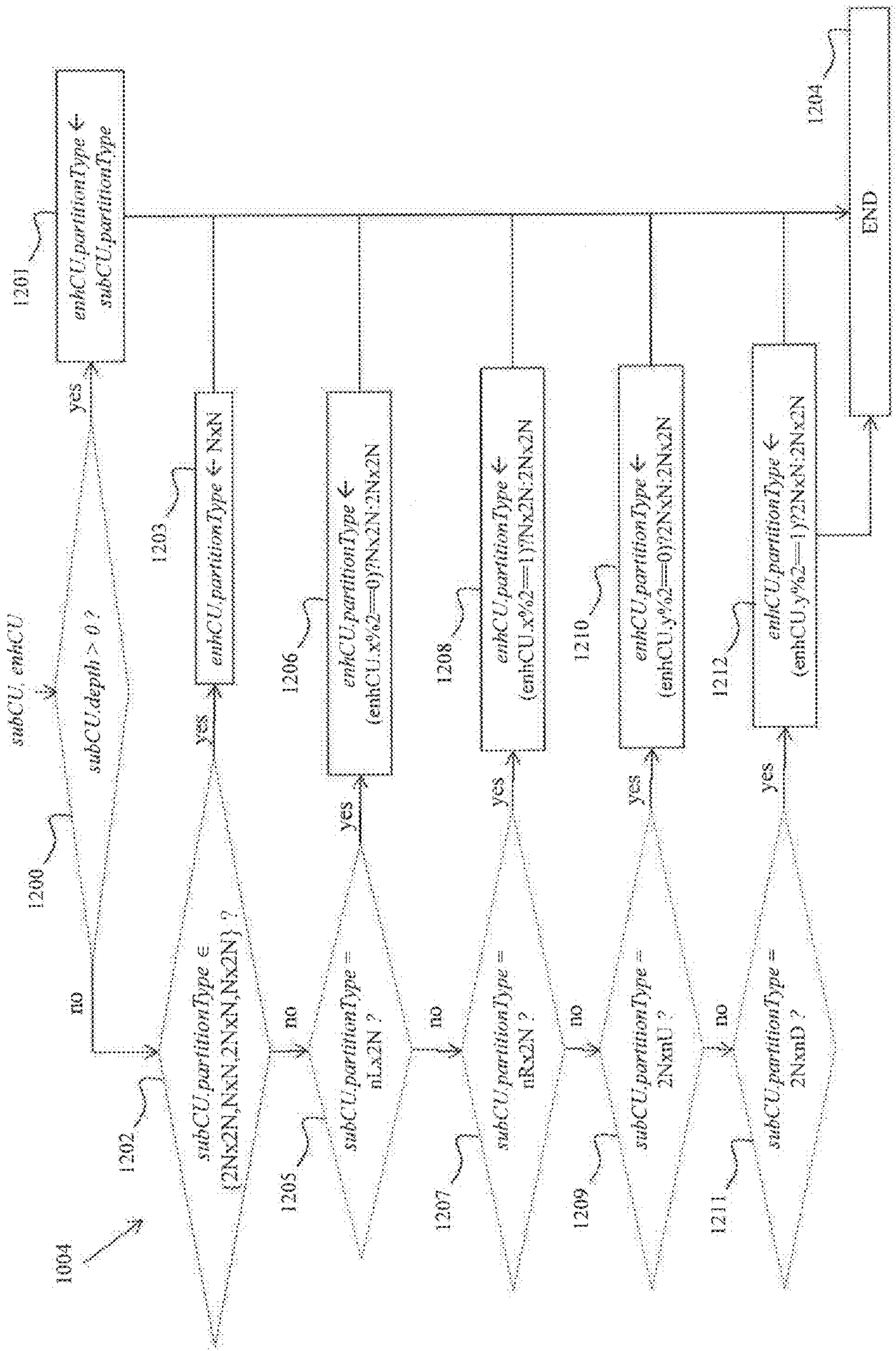

FIG. 10 illustrates a global algorithm according to an embodiment of the invention used to derive the prediction information from the base layer to the enhancement layer, FIG. 11 illustrate the variables used in the algorithm illustrated in FIG. 10, and FIG. 12 illustrates more in detail a step of the algorithm depicted in the FIG. 10.

Figure 1:
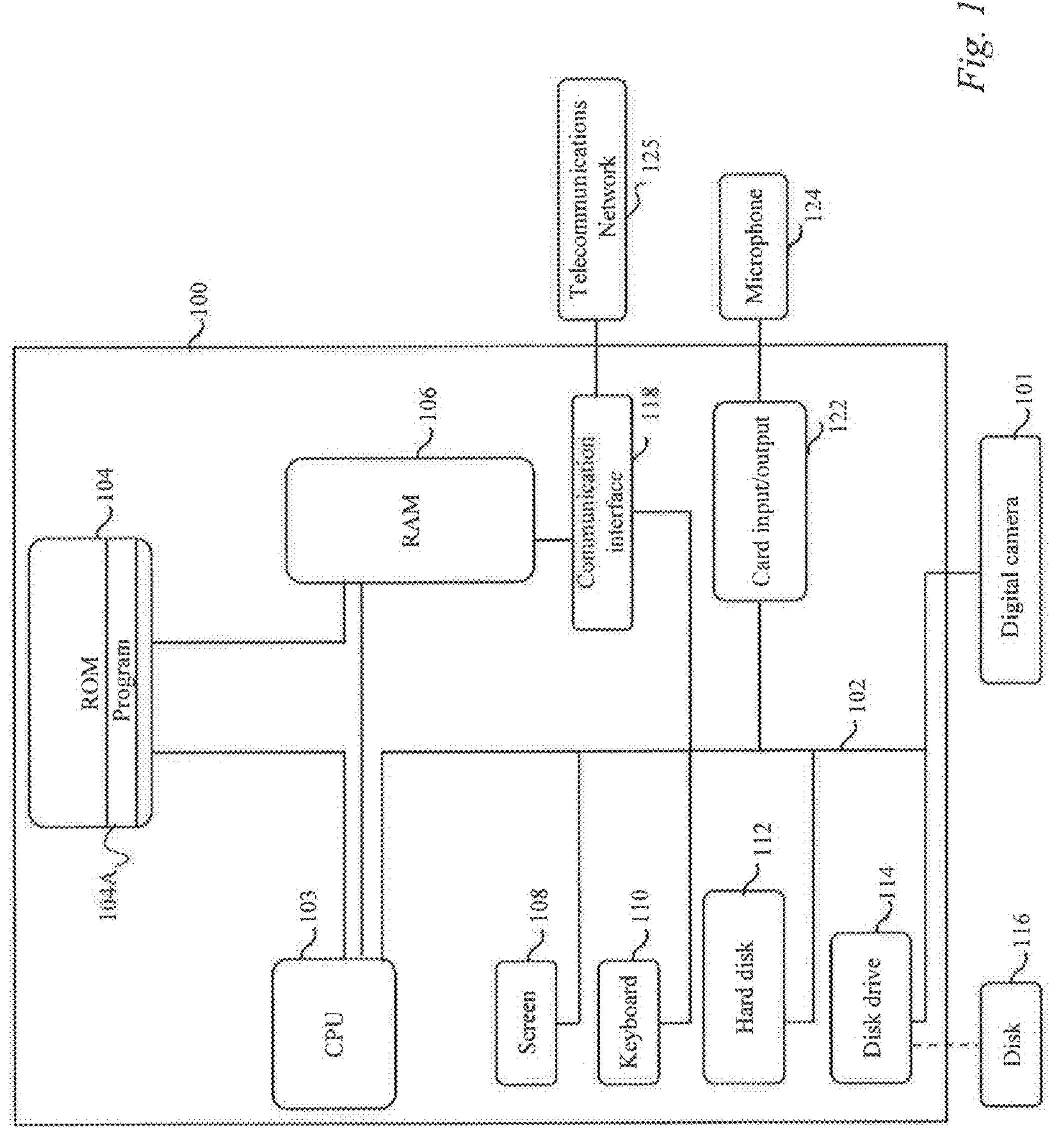
FIG. 1 illustrates an example of a device for encoding or decoding images, capable of implementing one or more embodiments of the present invention.

FIG. 1 shows a device 100, in which one or more embodiments of the invention may be implemented, illustrated arranged in cooperation with a digital camera 101, a microphone 124 (shown via a card input/output 122), a telecommunications network 34 and a disc 116, comprising a communication bus 102 to which are connected:

- a central processing CPU 103, for example provided in the form of a microprocessor a read only memory (ROM) 104 comprising a program 104A whose execution enables the methods according to the invention. This memory 104 may be a flash memory or EEPROM;

a random access memory (RAM) 106 which, after powering up of the device 100, contains the executable code of the program 104A necessary for the implementation of the invention. This RAM memory 106, being random access type, provides fast access compared to ROM 104. In addition the RAM 106 stores the various images and the various blocks of pixels as the processing is carried out on the video sequences (transform, quantization, storage of reference images etc.);

a screen 108 for displaying data, in particular video and/or serving as a graphical interface with the user, who may thus interact with the programs according to the invention, using a keyboard 110 or any other means e.g. a mouse (not shown) or pointing device (not shown);

a hard disk 112 or a storage memory, such as a memory of compact flash type, able to contain the programs of the invention as well as data used or produced on implementation of the invention;

an optional disc drive 114, or another reader for a removable data carrier, adapted to receive a disc 116 and to read/write thereon data processed, or to be processed, in accordance with the invention and;

a communication interface 118 connected to a telecommunications network 34 connection to a digital camera 101

The communication bus 102 permits communication and interoperability between the different elements included in the device 100 or connected to it. The representation of the communication bus 102 given here is not limiting. In particular, the CPU 103 may communicate instructions to any element of the device 100 directly or by means of another element of the device 100.

The disc 116 can be replaced by any information carrier such as a compact disc (CD-ROM), either writable or rewritable, a ZIP disc or a memory card. Generally, an information storage means, which can be read by a microcomputer or microprocessor, which may optionally be integrated in the device 100 for processing a video sequence, is adapted to store one or more programs whose execution permits the implementation of the method according to the invention.

The executable code enabling the coding device to implement the invention may be stored in ROM 104, on the hard disc 112 or on a removable digital medium such as a disc 116.

The CPU 103 controls and directs the execution of the instructions or portions of software code of the program or programs of the invention, the instructions or portions of software code being stored in one of the aforementioned storage means. On powering up of the device 100, the program or programs stored in non-volatile memory, e.g. hard disc 112 or ROM 104, are transferred into the RAM 106, which then contains the executable code of the program or programs of the invention, as well as registers for storing the variables and parameters necessary for implementation of the invention.

It should be noted that the device implementing the invention, or incorporating it, may be implemented in the form of a programmed apparatus. For example, such a device may then contain the code of the computer program or programs in a fixed form in an application specific integrated circuit (ASIC). The device 100 described here and, particularly the CPU 103, may implement all or part of the processing operations described below.

Figure 2:
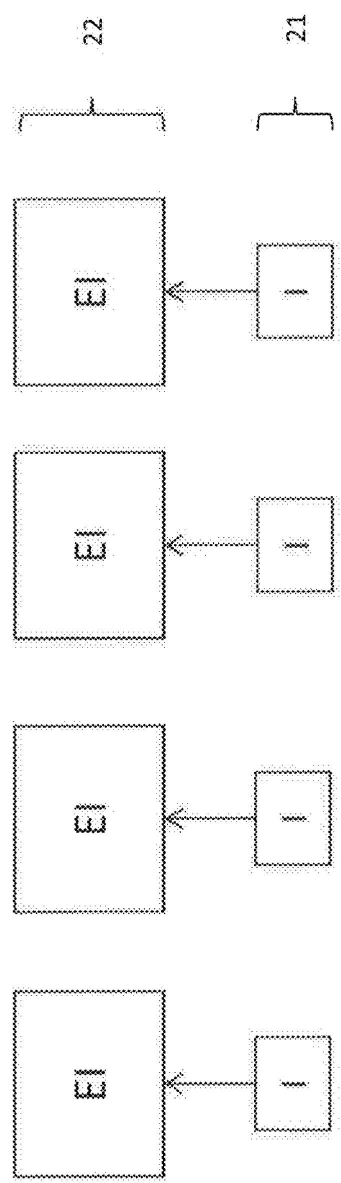
FIG. 2 illustrates an all-INTRA configuration for a base layer in scalable video coding.

FIG. 2 illustrates the structure of a scalable video stream 20, when all pictures are encoded in INTRA mode. As shown, an all-INTRA coding structure consists of series of pictures which are encoded independently from each other. The base layer 21 of the scalable video stream 20 is illustrated at the bottom of the figure. In this base layer, each picture is INTRA coding and is usually referred to as an "I" picture. INTRA coding involves predicting a block from its directly neighbouring blocks within a single image or frame.

A spatial enhancement layer 22 is encoded on top of the base layer 21. It is illustrated at the top of FIG. 2. This spatial enhancement layer 22 introduces some spatial refinement information over the base layer. In other words, the decoding of this spatial layer leads to a decoded video sequence that has a higher spatial resolution than the base layer. The higher spatial resolution adds to the quality of the reproduced images.

As illustrated in the figure, each enhancement picture, denoted an 'EI' picture, is intra coded. An enhancement INTRA picture is encoded independently from other enhancement pictures. It is coded in a predictive way, by predicting it only from the temporally coincident (or collocated) picture in the base layer.

Figure 3:
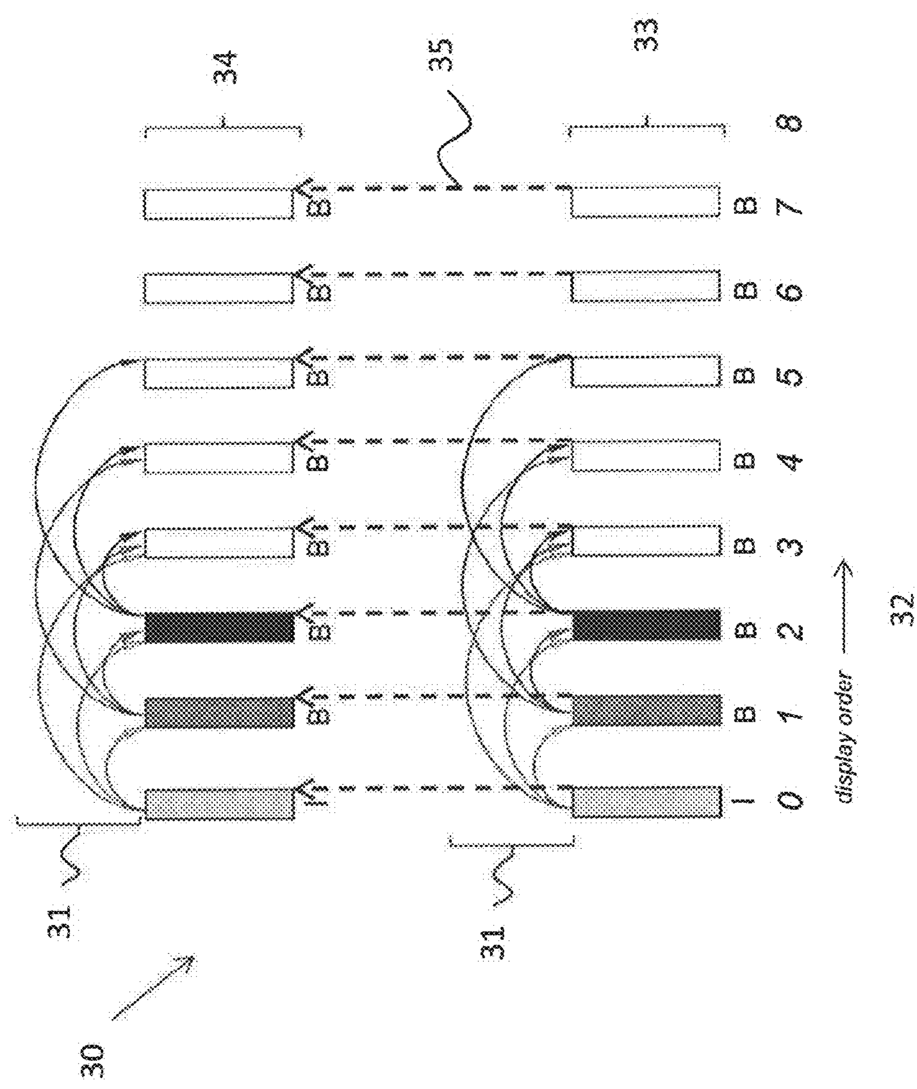
FIG. 3 illustrates a low-delay temporal coding structure according to the HEVC standard.

FIG. 3 shows the low-delay temporal coding structure 30. In this configuration, an input image frame is predicted from several already coded frames. Therefore, only forward temporal prediction, as indicated by arrows 31, is allowed, which ensures the low delay property. The low delay property means that on the decoder side, the decoder is able to display a decoded picture straight away once this picture is in a decoded format, as represented by arrow 32. Note: the input video sequence is shown as comprised of a base layer 33 and an enhancement layer 34, which are each further comprised of a first image frame I and subsequent image frames B.

In addition to temporal prediction, inter-layer prediction between the base 33 and enhancement layer 34 is also illustrated in FIG. 3 and referenced by arrows, including arrow 35. Indeed, the scalable video coding of the enhancement layer 34 aims to exploit the redundancy that exists between the coded base layer 33 and the enhancement layer 34, in order to provide good coding efficiency in the enhancement layer 34.

In particular, the motion information contained in the base layer can be advantageously used in order to predict motion information in the enhancement layer. In this way, the efficiency of the predictive motion vector coding in the enhancement layer can be improved, compared to non-scalable motion vector coding, as specified in the HEVC video compression system for instance. More generally, inter-layer prediction of the prediction information, which includes motion information, based on the prediction information contained in the coded base layer can be used to efficiently encode an enhancement layer, on top of the base layer.

In the case of spatial scalability, the inter-layer prediction implies that prediction information taken from the base layer should undergo spatial up-sampling. Embodiments of the present invention provide a method to efficiently up-sample HEVC prediction information, in particular in the case of dyadic spatial scalability. This case will be explained more in detail below.

Figure 4:
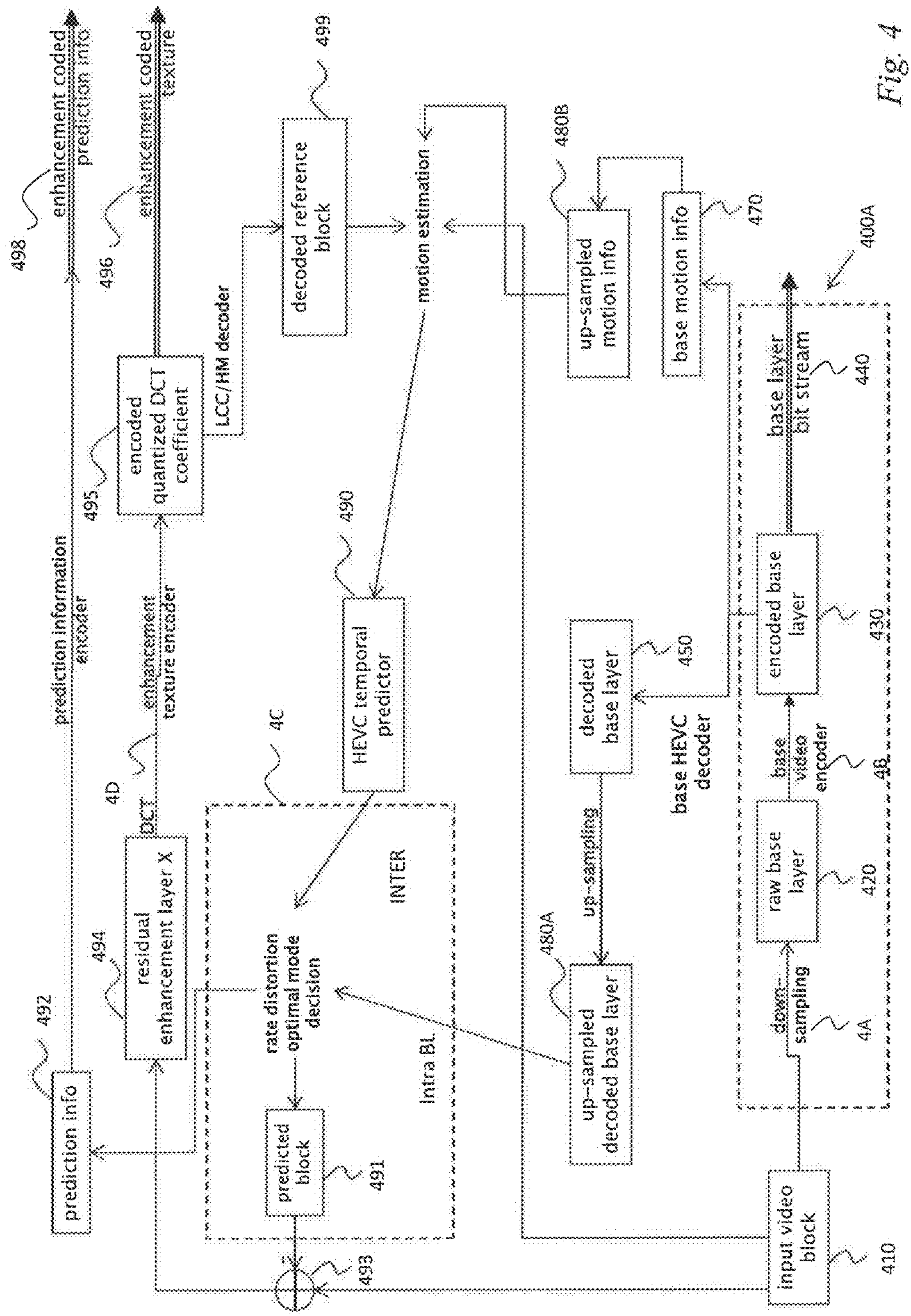
FIG. 4 illustrates an embodiment of encoder architecture according to an embodiment of the invention.

FIG. 4 illustrates an exemplary encoder architecture 400, which includes a spatial up-sampling step applied on prediction information contained in the base layer, as proposed by the invention. The diagram of FIG. 4 illustrates the base layer coding, and the enhancement layer coding process for a given picture of a scalable video.

The first stage of the process corresponds to the processing of the base layer, and is illustrated on the bottom part of the FIG. 400A.

First, the input picture to code 410 is down-sampled 4A to the spatial resolution of the base layer, a raw base layer 420. Then it is encoded 4B in an HEVC compliant way, which leads to the "encoded base layer" 430 and associated base layer bitstream 440. In the next step, some information is extracted from the coded base layer that will be useful afterwards in the inter-layer prediction of the enhancement picture. The extracted information comprises at least.

The reconstructed (decoded) base picture 450 which is later used for inter-layer texture prediction.

The base prediction/motion information 470 of the base picture which is used in several inter-layer prediction tools in the enhancement picture. It comprises, among others, coding unit information, prediction unit partitioning information, prediction modes, motion vectors, reference picture indices, etc.

Once this information has been extracted from the coded base picture, it undergoes an up-sampling process, which aims at adapting this information to the spatial resolution of the enhancement layer. The up-sampling of the extracted base information is effected as described below, for the three types of data listed above.

With respect to the reconstructed base picture 450, it is up-sampled to the spatial resolution of the enhancement layer 480A. An interpolation filter corresponding to the DCTIF 8-tap filter used for motion compensation in HEVC is employed.

The base prediction/motion information 470 is transformed, so as to obtain a coding unit representation that is adapted to the spatial resolution of the enhancement layer 480B. The prediction information up-sampling mechanism is introduced below.

Once the information extracted from the base layer is available in its up-sampled form, then the encoder is ready to predict the enhancement picture 4C. The prediction process used in the enhancement layer is executed in an identical way on the encoder side and on the decoder side.

The prediction process consists in selecting the enhancement picture organization in a rate distortion optimal way in terms of coding unit (CU) representation, prediction unit (PU) partitioning and prediction mode selection. These concepts are further defined below in connection with FIG. 5, and form part of the HEVC standard.

Figure 5:
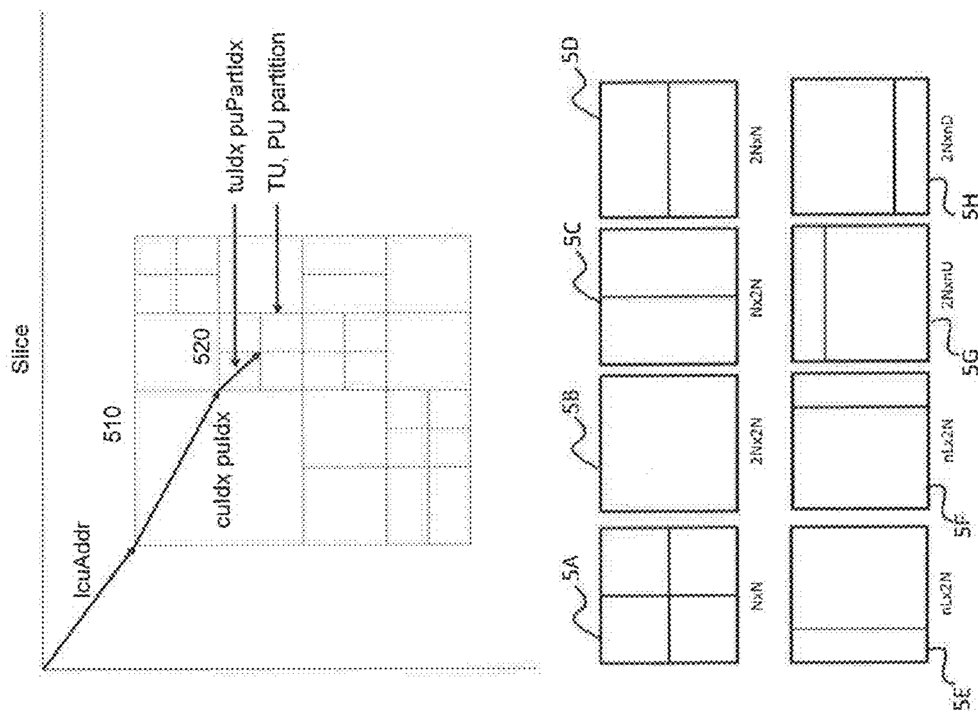
FIG. 5 illustrates coding units and prediction unit concepts specified in the HEVC standard.

FIG. 5 depicts the coding units and prediction unit concepts specified in the HEVC standard. An HEVC coded picture is made of a series of coding units. A coding unit of an HEVC picture corresponds to a square block of that picture, and can have a size in a pixel range from 8×8 to 64×64. A coding unit which has the highest size authorized for the considered picture is also called a Largest Coding Unit (LCU) 510. For each coding unit of the enhancement picture, the encoder decides how to partition it into one or several prediction units (PU) 520. Each prediction unit can have a square or rectangular shape and is given a prediction mode (INTRA or INTER) and some prediction information. With respect to INTRA prediction, the associated prediction parameters consist in the angular direction used in the spatial prediction of the considered prediction unit, associated with corresponding spatial residual data. In case of INTER prediction, the prediction information comprises the reference picture indices and the motion vector(s) used to predict the considered prediction unit, and the associated temporal residual texture data. Illustrations 5A to 5H show some of the possible arrangements of partitioning (or type) which are available.

Referring again to FIG. 4, the prediction process 4C attempts to construct a whole prediction picture 491 of current enhancement picture to code. To do so, it determines the best rate distortion trade-off between the quality of that prediction picture and the rate cost of the prediction information to encode. The outputs of this prediction process are the following.

A set of coding units with associated size, which covers the whole prediction picture.

For each coding unit, a partitioning of this coding unit into one or several prediction units. Each prediction unit is selected among all the prediction unit shapes allowed by the HEVC standard, which are illustrated on the bottom of FIG. 5.

For each prediction unit, a prediction mode decided for that prediction unit, together with the prediction parameters associated with that prediction unit.

Therefore, for each candidate coding unit in the enhancement picture, the prediction process of FIG. 4 determines the best prediction unit partitioning and prediction unit parameters in that candidate CU.

In particular, for a given prediction unit partitioning of the CU, the prediction process searches the best prediction type for that prediction unit. In HEVC, each prediction unit is given the INTRA or INTER prediction mode. For each mode, prediction parameters are determined. INTER prediction mode consists in the motion compensated temporal prediction of the prediction unit. This uses two lists of past and future reference pictures depending on the temporal coding structure used (see FIG. 7 and FIG. 8). This temporal prediction process as specified by HEVC is re-used here. This corresponds to the prediction mode called "HEVC temporal predictor" 490 on FIG. 4. Note that in the temporal predictor search, the prediction process searches the best one or two (respectively for uni- and bi-directional prediction) reference blocks to predict a current prediction unit of current picture.

INTRA prediction in HEVC consists in predicting a prediction unit with the help of neighboring prediction units of current prediction unit that are already coded and reconstructed. In addition to spatial prediction process of HEVC, another INTRA prediction type can be used, called "Intra BL". The Intra BL prediction type consists of predicting a prediction unit of the enhancement picture with the spatially corresponding block in the up-sampled decoded base picture. Note that the "Intra BL" prediction mode tries to exploit the redundancy that exists between the underlying base picture and current enhancement picture. It corresponds to so-called inter-layer prediction tools that can be added to the HEVC coding system, in the coding of a scalability layer.

The "rate distortion optimal mode decision" of FIG. 4 results in the following elements.

A set of coding unit representations with associated prediction information for current picture. This is called prediction information 492 on FIG. 4. All this information then undergoes a prediction information coding step, which constitutes a part of the coded video bitstream. Note that in this prediction information coding, the inter-layer prediction mode, i.e. Intra BL, is signaled as particular INTRA prediction modes. Note that according to another embodiment, the "Intra BL" prediction picture of FIG. 4 can be inserted into the list of reference pictures used in the temporal prediction of current enhancement picture.

A block 491, which represents the final prediction picture of current enhancement picture to code. This picture is then used to encode the texture data part of current enhancement picture.

The next encoding step illustrated in FIG. 4 consists of computing the difference 493 between the original block 410 and the obtained prediction block 491. This difference comprises the residual data of current enhancement picture 494, which is then processed by the texture coding process 4D (for example comprising a DCT transform following by a quantization of the DCT coefficients and entropy coding). The process provides encoded quantized DCT coefficients 495 which comprise enhancement coded texture 496 for output. A further available output is the enhancement coded prediction information 498 generated from the prediction information 492.

Moreover, the encoded quantized DCT coefficients 495 undergo a reconstruction process, then are stored into a decoded reference block 499 which is used afterwards in the motion estimation information used in the computation of the prediction mode called "HEVC temporal predictor" 490.

Figure 6:
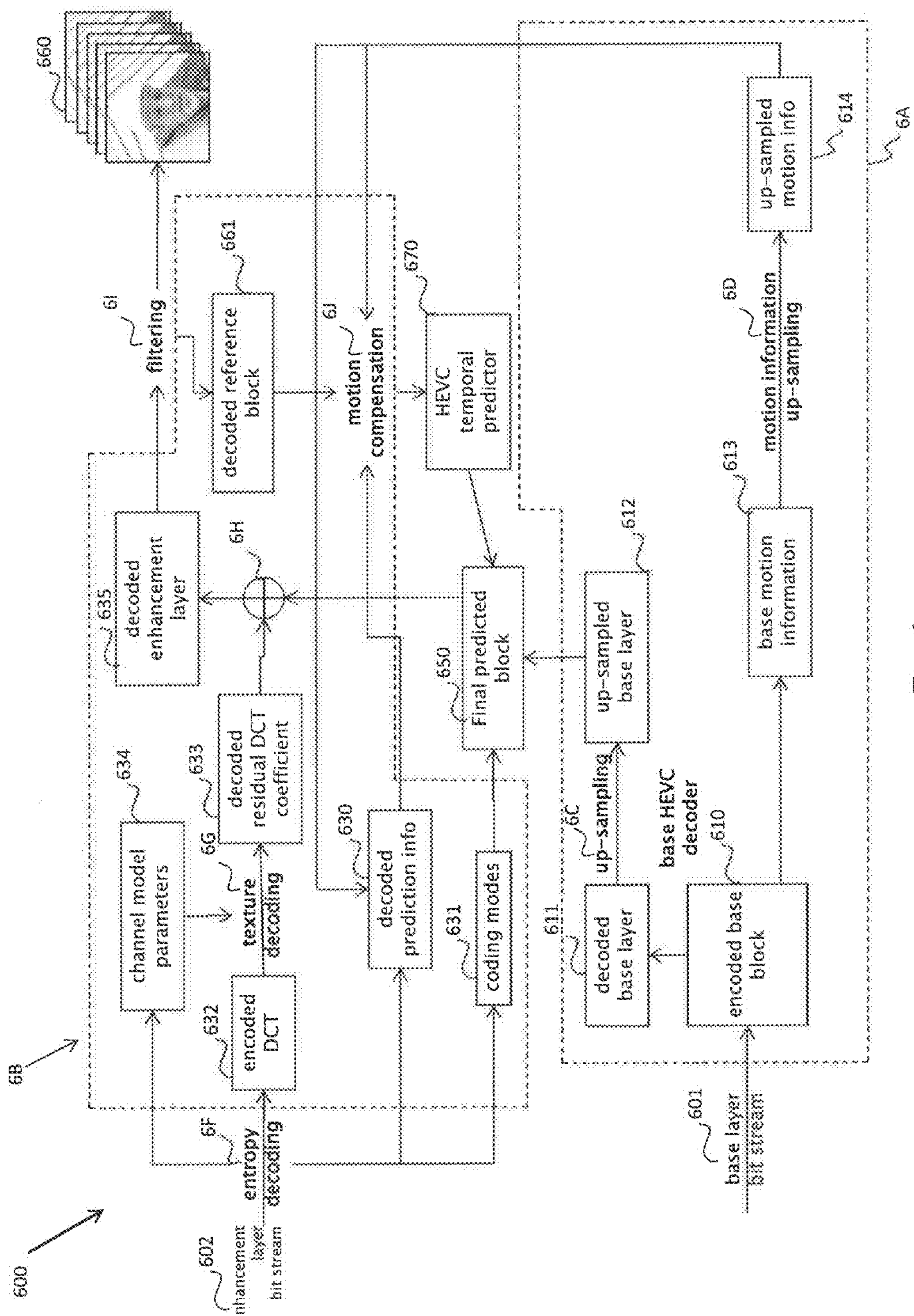
FIG. 6 illustrates an embodiment of architecture of a scalable video decoder according to an embodiment of the invention.

FIG. 6 depicts an architecture of a scalable video decoder 160 suitable for embodying aspects of the invention. This decoder architecture performs the reciprocal process of the encoding process of FIG. 4. The inputs to the decoder illustrated in FIG. 6 are:

The coded base layer bit-stream 601, and

The coded enhancement layer bit-stream 602.

The first stage of the decoding process corresponds to the decoding 6A of the base layer encoded base block 610. This decoding is then followed by the preparation of all data useful for the inter-layer prediction of the enhancement layer 6B. The data extracted from the base layer decoding step is of two types:

The decoded base picture 611 undergoes a spatial up-sampling step 6C, in order to form the "Intra BL" prediction picture 612. The up-sampling process 6C used here is identical to that of the encoder (FIG. 4);

The prediction information contained in the base layer (base motion information 613) is extracted and re-sampled 6D towards the spatial resolution of the enhancement layer. The prediction info up-sampling process is the same as that used on the encoder side.

Next, the processing of the enhancement layer 6B is effected as illustrated in the upper part of FIG. 6. This begins with the entropy decoding 6F of the prediction information contained in the enhancement layer bit-stream to provide decoded prediction information 630. This, in particular, provides the coding unit organization of the enhancement picture, as well as their partitioning into prediction units, and the prediction mode (coding modes 631) associated to each prediction unit. In particular, the prediction information decoded in the enhancement layer may consist in some refinement of the prediction information issued from the up-sampling step 614. In that case, the reconstruction of the prediction information 630 in the enhancement layer makes use of the up-sampled base layer prediction information 614.

Once the prediction mode of each prediction unit of the enhancement picture is obtained, the decoder 600 is able to construct the successive prediction blocks 650 that were used in the encoding of current enhancement picture. The next decoder steps then consist of decoding 6G the texture data (encoded DCT coefficients 632) associated to current enhancement picture. This texture decoding process follows the reverse process regarding the encoding method in FIG. 4 and produces decoded residual 633.

Once the residual block 633 is obtained from the texture decoding process, it is added 6H to the prediction block 650 previously constructed. This, applied on each enhancement picture's block, leads to the decoded current enhancement picture 635 which, optionally, undergoes some in-loop post-filtering process 61. Such processing may comprise a HEVC deblocking filter, Sample Adaptive Offset (specified by HEVC) and/or Adaptive Loop Filtering (also specified by the HEVC standard).

The decoded picture 660 is ready for display and the individual frames can each be stored as a decoded reference block 661, which may be useful for motion compensation 6J in association with the HEVC temporal predictor 670, as applied for subsequent frames.

Figure 7:
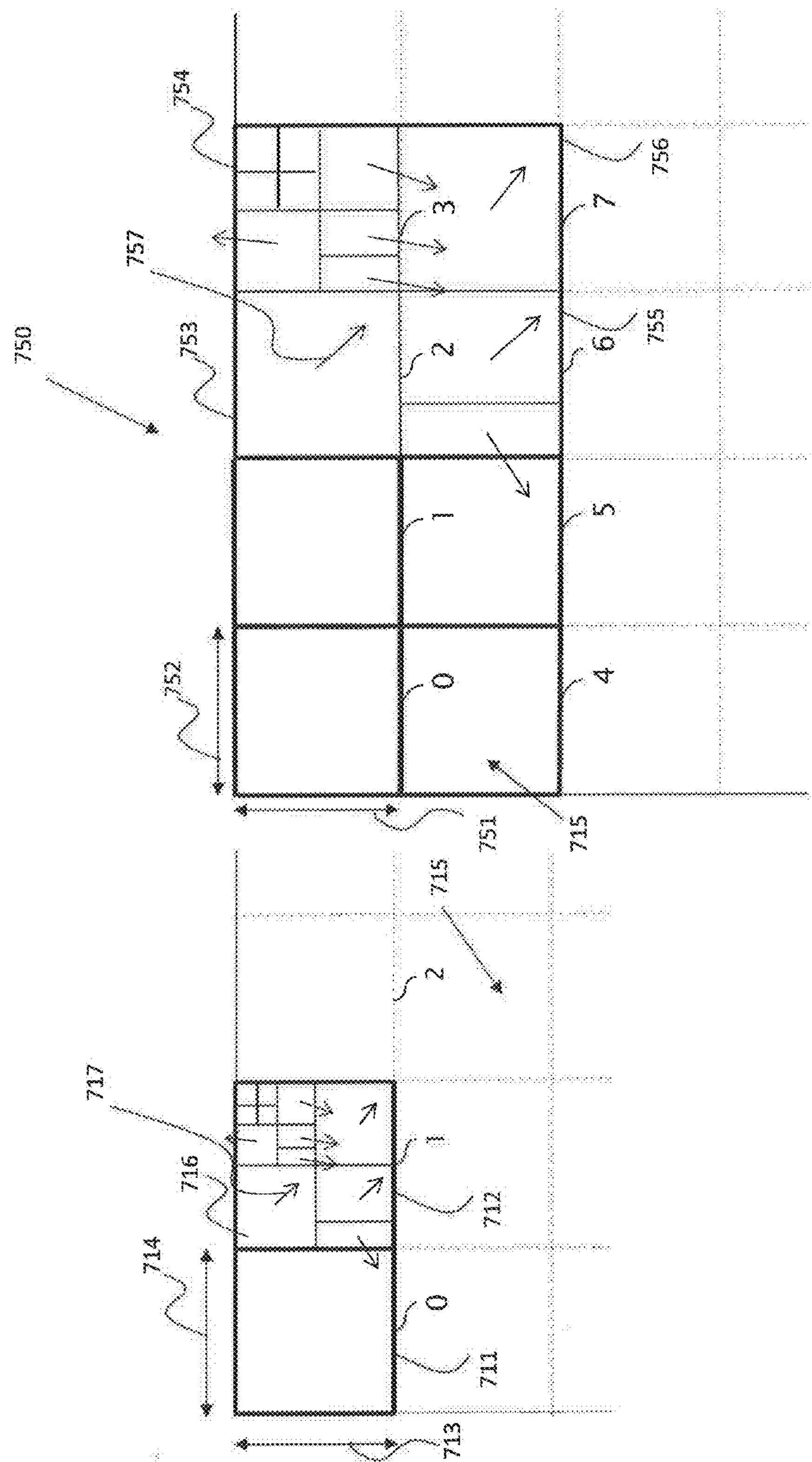
FIG. 7 illustrates an example of the prediction information up-sampling process.

FIG. 7 depicts the prediction information up-sampling process (step 6C in FIG. 6 for instance). The prediction information up-sampling step is a useful mean to perform inter-layer prediction. The left side of FIG. 7, 710, illustrates a part of the base layer picture. In particular, the Coding Unit representation that has been used to encode the base picture is illustrated, for the two first LCUs (Largest Coding Unit) of the picture 711 and 712. The LCUs have a height and width, represented by arrows 713 and 714, respectively, and an identification number 715, here shown running from zero to two. The Coding Unit quad-tree representation of the second LCU 712 is illustrated, as well as prediction unit (PU) partitions e.g. partition 1716. Moreover, the motion vector associated to each prediction unit, e.g. vector 717 associated with prediction unit 716, is showed.

On the right side of FIG. 7 is shown the organization of LCUs, coding units and prediction units in the enhancement layer 750 that correspond to the base layer organization 710. Hence the result of the prediction information up-sampling process can be seen. On this figure, the LCU size (height and width indicated by arrows 751 and 752, respectively) is the same in the enhancement picture and in the base picture, i.e. the base picture LCU has been magnified. As can be seen, the up-sampled version of base LCU 712 results in the enhancement LCUs 2, 3, 6 and 7 (references 753, 754, 755 and 756, respectively). The individual prediction units exist in a scaling relationship known as a quad-tree. Note that the coding unit quad-tree structure of coding unit 712 has been re-sampled in 750 as a function of the scaling ratio that exists between the enhancement picture and the base picture. The prediction unit partitioning is of the same type (i.e. the corresponding prediction units have the same shape) in the enhancement layer and in the base layer. Finally, motion vector coordinates e.g. 757 have been re-scaled as a function of the spatial ratio between the two layers.

In other words, three main steps are involved in the prediction information up-sampling process:

The coding unit quad-tree representation is first up-sampled. To do so, a depth parameter of the base coding unit is decreased by one in the enhancement layer.

The coding unit partitioning mode is kept the same in the enhancement layer, compared to the base layer. This leads to prediction units with an up-scaled size in the enhancement layer, The motion vector is re-sampled to the enhancement layer resolution, simply by multiplying associated x and y coordinates by the appropriate scaling ratio.

As a result of the prediction information up-sampling process, some prediction information is available on the encoder and on the decoder side, and can be used in various inter-layer prediction mechanisms in the enhancement layer.

In the current scalable encoder and decoder architectures, these up-scaled prediction information is used for the inter-layer prediction of motion vectors in the coding of the enhancement picture. Therefore one additional predictor is used compared to HEVC, in the predictive coding of motion vectors.

Figure 8:
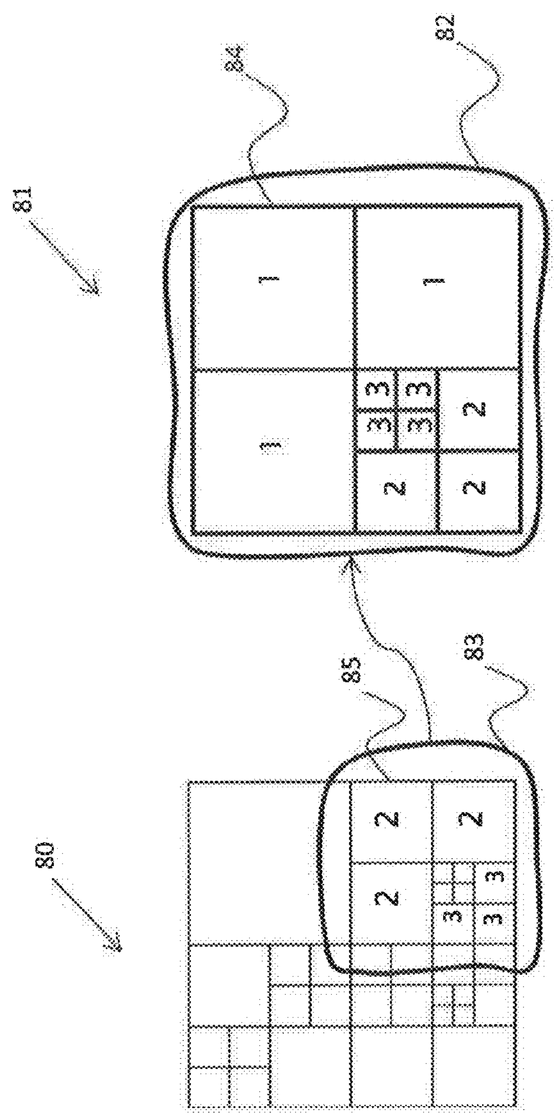
FIG. 8 illustrates the upsampling of a Largest Coding Unit from the base layer to an enhancement layer.

FIG. 8 depicts more precisely the first part of the up-sampling process previously presented in FIG. 7, in particular applied on base layer's prediction information, which is used afterwards for inter-layer prediction matters. It is recalled that the coding units of HEVC have a maximum size equal to 64×64, and are organized in a quad-tree way to represent a coded HEVC picture.

The invention proposes in a particular embodiment to up-sample prediction information from a base layer 80 to an enhancement layer 81, in the case of dyadic spatial scalability, and more generally when the base layer and the enhancement layer are linked by a ratio of $4^p$ (p≥1). More generally, the base layer could be replaced by an enhancement layer having a lower level than the considered up-sampled enhancement layer 81.

The overall prediction up-sampling process in FIG. 7 consists in up-sampling first the coding unit structure, and then in up-sampling the prediction unit partitions. This second part will be explained more in detail below.

As already explained, the coding units in HEVC are organized in a quad-tree fashion. To do so, each coding unit has an associated depth level in the quad-tree. The up-sampling of coding units consists in the following method. For a given Largest Coding Unit (LCU) 82 in the enhancement layer 81, the area 83 that spatially corresponds to that enhancement LCU 82 is searched in the base layer (or base/lower layer part) 80. The enhancement LCU 82 is then given coding unit depth values that are equal to the depth values contained in the corresponding area in the base layer 80, decreased by 1.

For example, the enhancement coding unit 84 corresponds to the base layer area 85 (four times smaller). The depth associated to the base layer area 85 is "2", then the depth associated to the enhancement coding unit 84 is "1". These decreased depth values then provide a quad-tree that corresponds to the quad-tree in the base picture, up-sampled by 2 in width and height.

FIGS. 9*a*, 9*b* and 9*c* illustrate the method proposed by embodiments of the invention, in order to up-sample prediction unit partitions. The proposed mechanism up-samples base prediction units in a different way, according to the prediction unit partition type in the base layer. For each up-sampled coding unit in the enhancement layer 90*a*, 90*b*, 90*c*, the following applies:

- If the co-located coding unit in the base layer (or base CU) has a depth higher than zero, then the prediction unit type in the enhancement CU is set equivalent to the prediction unit type in the base layer.
- In the opposite case, if the base CU, 91*a*, 91*b*, 91*c*, has a depth value equal to 0, i.e. the co-located base CU has the maximum allowed size which is the LCU's size, then
  - If the co-located base CU has a symmetric prediction unit partition 92*a*, 93*a* (meaning that they have the same size), then the up-sampled coding unit in the enhancement layer 90*a* is given the 2N×2N prediction unit type, 94*a*, 95*a*, 96*a* and 97*a*. A 2N×2N prediction unit type has a substantially square shape. The prediction units 94*a*, 95*a*, 96*a* and 97*a* are arranged to provide the same subdivision line 98*a* as the co-located base CU subdivision line 99*a*. The reason for that is that the base CU, when up-sampled to the enhancement layer resolution, spatially covers four LCUs in the enhancement picture, or conversely, each LCU in the enhancement layer corresponds only to a fraction of a (smallest available) CU in the base layer.
  - If the co-located base CU 91*b*, 91*c* is asymmetric, meaning that its first and second prediction units 92*b*/93*b* and 92*c*/93*c* have respectively different sizes, then the up-sampled coding unit in the enhancement layer 90*b*/90*c* is assigned a prediction unit type that depends on its spatial position in the enhancement layer, and on the base asymmetric prediction unit type.

Indeed, on the example of FIG. 9*b*, the co-located base CU has a prediction unit (PU) type equal to nL×2N. The spatial up-sampling of the co-located base CU covers four Largest Coding Units (or LCU) 94*b*, 95*b*, 96*b*, 97*b* in the enhancement layer. As the goal of the PU up-sampling is to preserve the spatial geometry (here orientation and proportion) of the co-located base CU, the enhancement prediction unit (951*b*, 952*b*, 961*b*, 962*b*, 94*b*, 97*b*) assignment is done as follows.

- Enhancement LCUs that have an even x index, 95*b*, 96*b*, comprise prediction units whose type is N×2N, meaning that they have a substantially rectangular shape along the vertical direction.
- Enhancement LCUs that have an odd x index, 94*b*, 97*b*, comprise prediction units whose type is 2N×2N, previously mentioned.

Similarly on the example of FIG. 9*c*, the co-located base CU has a prediction unit (PU) type equal to 2N×nD. The spatial up-sampling of the co-located base CU covers four Largest Coding Units (or LCU) 94*c*, 95*c*, 96*c*, 97*c* in the enhancement layer. As the goal of the PU up-sampling is to preserve the spatial geometry (here orientation and proportion) of the co-located base CU, the enhancement prediction unit (95*c*, 961*c*, 962*c*, 94*c*, 971*b*, 972*c*) assignment is done as follows.

- Enhancement LCUs that have an even y index, 96*c*, 97*c*, are given prediction units with type 2N×N, meaning that they have a substantially rectangular shape along the horizontal direction.
- Enhancement LCUs that have an odd y index, 94*c*, 95*c*, are given prediction unit with type 2N×2N, previously mentioned.

Therefore, aspects of the invention provide the effect that for base coding units that have the maximum allowed size (in other words the coding units that have the size of a largest coding unit, or a CU which is also a LCU), asymmetric LCU/CU are transformed into symmetric enhancement LCU in the enhancement layer.

FIG. 10 illustrates the global prediction information up-sampling process employed in the scalable video codec of FIGS. 4 and 6. The inputs to this process consists in the enhancement picture currently being processed by the scalable coder of FIG. 4 or the decoder of FIG. 6. It is considered here, as an example, that the enhancement layer's resolution is four times bigger than the base layer resolution. The different units mentioned below are illustrated in FIG. 11.

The algorithm performs a loop on the Largest Coding Units (LCUs) contained in enhancement layer of the current picture. For each LCU noted currLCU, the process illustrated in FIG. 10 aims at computing the prediction information of that LCU, by transforming the prediction of the base picture's coding units that spatially coincide with current enhancement LCU currLCU. To do so, the following steps are applied for current enhancement LCU.

First, after the current enhancement LCU currLCU initialization 1000, the spatial area in the base picture that spatially corresponds to current enhancement LCU is determined 1001. This spatial area called baseCU, corresponds to a portion of a LCU in the base picture. Its size is ¼ of the LCU size in the base layer.

Secondly, a loop on base layer's coding units that are contained in the area called baseCU is performed, in the base layer. Indeed, several cases may be possible:

- the area baseCU may be contained within a coding unit of the base layer, if the LCU at that spatial location is not divided into CUs;
- the area baseCU contains exactly one coding unit in the base layer;
- the area baseCU contains several coding units in the base layer.

Therefore, the loop on the base picture coding units concerned by the area baseCU processes at least one coding unit in the base layer. Each coding unit processed by this loop is noted subCU, 1002.

For each considered coding unit subCU of the base layer, a corresponding coding unit in the enhancement layer, noted enhCU, is being created 1002 by the up-sampling process. For each successively considered coding units subCU and enhCU, the process assigns 1003 a depth value to the enhancement coding unit being created enhCU. This depth is set equal to the depth value of the corresponding base coding unit subCU, decreased by 1. If the base coding unit subCU has a depth equal to 0, then the depth of the enhancement coding unit enhCU is also set to 0.

The next step 1004 of the process consists in deriving the prediction unit partition of the base coding unit subCU, in order to assign an appropriate prediction unit partition of the enhancement coding unit enhCU. This step 1004 will be described more in detailed in the next figure.

Once the prediction unit type of the base coding unit subCU is transform and the resulting base prediction unit type is given to the enhancement unit enhCU, the prediction information of each prediction unit contained in enhCU is derived from the prediction unit(s) of the base coding unit subCU, 1005. The derived prediction information comprises, among others, known prediction modes (INTRA, INTER, SKIP), motion vectors, reference picture indices, etc.

If the base coding unit subCU is not the last to process 1006, then the following base coding unit subCU is considered 1007 and consequently, the next enhancement unit enhCU 1008 until all base coding units concerned by the baseCUs in the base picture are processed, 1009.

FIG. 11 depicts the units involved in the processed in FIG. 10. First base layer 1104 largest coding unit 1102 and enhancement layer 1105 largest coding unit 1103 have height and width, represented by arrows 1100 and 1101, respectively. A unit in the base layer 1104 named baseCU is referenced 1106. A coding unit in the base layer 1104 named subCU is referenced 1107. A largest coding unit in the enhancement layer 1105 currently processes and named currLCU is referenced 1108. The unit in the enhancement layer 1105 named enhCU is referenced 1109.

FIG. 12 illustrates more in detail the step 1004 of the FIG. 10. The input to the first step 1200 are:

- the current coding unit enhCU being considered in current enhancement layer by the step 1004 of the FIG. 10, and
- the current coding unit subCU being considered in current base layer by the in the step 1004 of the FIG. 10.

A goal of the process illustrated in FIG. 12 is to provide the enhancement coding unit enhCU with the prediction unit partition that best reflects the motion information contained in the base layer, contrary to prior-art solution.

The first step 1200 of the algorithm tests if the depth value of current base coding unit subCU is higher than zero. If this is the case, then the algorithm assigns the same prediction unit type to the enhancement CU as that of the base coding unit, 1201, and the process is over, 1204. Otherwise, a particular prediction unit derivation process proposed by this invention takes place.

The following steps correspond to the case where the depth value of the base CU is equal to zero, which means the size of the base coding unit is equal to the highest coding unit size allowed (the size of the largest coding unit, as previously said). This covers the practical examples previously presented by FIGS. 9*a*, 9*b* and 9*c*. The following then applies.

In a step 1202, it is tested if the prediction unit type of the base coding unit subCU is a symmetric prediction unit type, meaning the prediction units have the same size, or there is only one prediction unit. If this test is positive, then the enhancement coding unit is given the prediction unit type 2N×2N, as explained above for the FIGS. 9*a*, 9*b* and 9*c*, step 1203. An example of such configuration was represented in FIG. 9*a*. Then the process is over, 1204. Note that in this case, it is also possible to provide the enhancement coding unit with an N×N prediction unit type. It can be an advantage if the enhancement layer coding process includes a refinement step of the up-sampled motion information.

If the previous test is negative, then the next step 1205 of the process, tests if the base coding unit has an associated prediction unit type equal to nL×2N. This corresponds to the asymmetric prediction unit type illustrated in FIG. 9*b*, in the base layer. If this test is positive, the next step is the step 1206. In this case, the prediction unit type assigned to the enhancement coding unit depends on the parity of the enhancement coding unit x-position. If the x-coordinate of the enhancement coding unit is even, then the enhancement coding unit is assigned the prediction unit type N×2N. This corresponds to the left side enhancement coding unit illustrated in FIG. 9*b*. Otherwise the enhancement coding unit is assigned the prediction unit type 2N×2N. Once the prediction unit type is assigned to the enhancement coding unit, the process is over, 1204.

If the previous test is negative, then the next step 1207 of the algorithm tests if the prediction unit type of the base coding unit is equal to nR×2N. If so, then the process moves to the step 1208, where the prediction unit type assignment in the enhancement coding unit again depends on the parity of the x-coordinates of the enhancement coding unit. If it is odd, then the enhancement coding unit is assigned the prediction unit type N×2N. Otherwise, it is given the prediction unit type 2N×2N. Next the process goes to its end, 1204.

If the previous test is negative, then the next step 1209 of the process tests if the prediction unit type of the base coding unit is equal to 2N×nU. If so, then the process moves to the step 1210, where the prediction unit type assignment in the enhancement coding unit again depends on the parity of the y-coordinate of the enhancement coding unit. If it is even, then the enhancement coding unit is assigned the prediction unit type 2N×N. Otherwise, it is given the prediction unit type 2N×2N. Next the process goes to its end, 1204.

If the previous test is negative, then the next step 1211 of the process tests if the prediction unit type of the base coding unit is equal to 2N×nD. If so, then the process moves to the step 1212 where the prediction unit type assignment in the enhancement coding unit depends once again on the parity of the y-coordinates of the enhancement coding unit. If it is odd, then the enhancement coding unit is assigned the prediction unit type 2N×N. Otherwise, it is given the prediction unit type 2N×2N. Next the process goes to its end, 1204. This last case corresponds to the exemplary case illustrated by FIG. 9*c*.

It will be understood that the present invention has been described above purely by way of example, and modification of detail can be made within the scope of the invention. Each feature disclosed in the description, and (where appropriate) the claims and drawings may be provided independently or in any appropriate combination.

The invention claimed is:

1. A method for scalable encoding of a digital image into a base layer and at least one enhancement layer comprising an up-sampling step providing at least one part of an enhancement layer, based on a corresponding part of a lower layer having a lower level than the considered enhancement layer, the area of said corresponding parts having a scale factor of $4^p$ ($p \geq 1$), the lower layer comprising at least one Largest Coding Unit divisible into Q Coding Units, said units being further divisible into K lower Prediction Units, wherein, for a Largest Coding Unit of said lower layer which is not divided into smaller Coding Units and which has lower Prediction Units of different sizes, the corresponding part of said enhancement layer is divided into K subdivisions having substantially equivalent proportions as the lower Prediction Units of different sizes.

2. The method according to claim 1, wherein the K subdivisions have the same orientation as the corresponding lower Prediction Units of different sizes.

3. The method according to claim 1, wherein the lower layer is the base layer.

4. The method according to claim 1, wherein said at least one part of the enhancement layer is divided into enhancement layer's Largest Coding Units, called enhancement Largest Coding Units, themselves being divided into one or more Prediction Units called enhancement Prediction Units and wherein, when the considered lower layer's Largest Coding Unit is not divided into smaller Coding Units and includes lower Prediction Units having different sizes, the enhancement Prediction Units, based on a corresponding lower Prediction Unit, are unitary or have substantially equivalent sizes and are arranged to form the enhancement layer portion's K subdivisions.

5. The method according to claim 4, wherein the lower and the enhancement Prediction Units have a type selected from a set of predefined prediction unit types.

6. The method according to claim 5, wherein at least one of the enhancement Prediction Units have a different type from the corresponding lower Prediction Unit.

7. The method according to claim 5, wherein when the considered lower layer's Largest Coding Unit comprises a unitary Coding Unit including lower Prediction Units having the same size, then the enhancement Prediction Units based on a corresponding lower Prediction Unit of the collocated lower layer part, have substantially equivalent sizes.

8. The method according to claim 5, wherein when the considered lower layer's Largest Coding Unit comprises at least two smaller Coding Units then the enhancement Prediction Units have the same type as the corresponding lower Prediction Units.

9. The method according to claim 7, wherein for each enhancement Largest Coding Unit, the upsampling step further comprising determining a corresponding area (baseCUs) within the lower layer part to the considered enhancement Largest Coding Units, said corresponding area being a factor $4^p$ smaller than the considered enhancement Largest Coding Unit, finding all the lower layer's Coding Units, called sub-Coding Units (subCU), included in said corresponding area of the collocated lower layer part, for each sub-Coding Units (subCU), determining an up-sampled Coding Unit (enhCU) within the considered enhancement layer part, each up-sampled Coding Unit being included in an enhancement Largest Coding Unit and comprising enhancement Prediction Units, for each upsampled Coding Unit (enhCU), determining its enhancement Prediction Units, and for each enhancement Prediction Unit of the up-sampled Coding Units (enhCU) deriving the prediction information from the corresponding lower Prediction Unit within considered the sub-Coding Unit (subCU).

10. The method according to claim 9, wherein determining an up-sampled Coding Unit (enhCU) within the considered enhancement layer further comprising finding the position of the up-sampled Coding Unit (enhCU) within the considered corresponding portion of the enhancement layer, and determining the size of the up-sampled Coding Unit based on the size of the corresponding sub-Coding Unit within the collocated lower layer part.

11. The method according to claim 9, wherein determining the enhancement Prediction Units of an up-sampled Coding Unit comprising 1) if the sub-Coding Unit corresponding to the considered up-sampled Coding Unit has a different size than the lower Largest Coding Unit in which it is included, then the enhancement Prediction Units have the same type as the corresponding lower Prediction Unit, 2) else if the sub-Coding Unit corresponding to the considered up-sampled Coding Unit has the same size as the lower Largest Coding Unit in which it is included, it is called sub-Largest Coding Unit and a) If the sub-Coding Unit has Predictions Units having substantially equal size or unitary Prediction Unit, then all the corresponding enhancement Largest Coding Units are assigned enhancement Prediction Units with a substantially square shape having the same size, b) Else if the sub-Coding Unit has Prediction Units having different sizes, then at least one corresponding enhancement Largest Coding unit is divided into enhancement Prediction Units with a rectangular shape having substantially equal sizes.

12. The method according to claim 11, wherein in the case 2a) the corresponding enhancement Largest Coding Units are assigned unitary enhancement Prediction Units.

13. The method according to the claim 11, wherein in the case 2a) the corresponding enhancement Largest Coding Units are assigned four enhancement Prediction Units with equal size.

14. The method according to claim 1, wherein the method further comprises, for each enhancement Prediction Unit, deriving prediction information from prediction information of the corresponding lower Prediction Unit.

15. A Method for scalable decoding a digital encoded image including a base layer and at least one enhancement layer comprising an up-sampling step providing at least one part of an enhancement layer, based on a corresponding part of a lower layer having a lower level than the considered enhancement layer, the area of said corresponding parts having a scale factor of $4^p$ (p≥1), the lower layer comprising at least one Largest Coding Unit divisible into Q Coding Units, said units being further divisible into K lower Prediction Units, wherein, for a Largest Coding Unit of said lower layer which is not divided into smaller Coding Units and which has lower Prediction Units of different sizes, said at least one part of said enhancement layer is divided into K subdivisions having substantially equivalent proportions as the lower Prediction Units of different sizes.

16. A non-transitory computer readable carrier medium comprising instructions which, when run on a computer or processor, causes the computer or processor to carry out a method for scalable encoding of a digital image into a base layer and at least one enhancement layer comprising an up-sampling step providing at least one part of an enhancement layer, based on a corresponding part of a lower layer having a lower level than the considered enhancement layer, the area of said corresponding parts having a scale factor of $4^p$ (p≥1), the lower layer comprising at least one Largest Coding Unit divisible into Q Coding Units, said units being further divisible into K lower Prediction Units, wherein, for a Largest Coding Unit of said lower layer which is not divided into smaller Coding Units and which has lower Prediction Units of different sizes, the corresponding part of said enhancement layer is divided into K subdivisions having substantially equivalent proportions as the lower Prediction Units of different sizes.

17. A non-transitory computer readable carrier medium comprising instructions which, when run on a computer or processor, causes the computer or processor to carry out a method for scalable decoding a digital encoded image including a base layer and at least one enhancement layer comprising an up-sampling step providing at least one part of an enhancement layer, based on a corresponding part of a lower layer having a lower level than the considered enhancement layer, the area of said corresponding parts having a scale factor of $4^p$ (p≥1), the lower layer comprising at least one Largest Coding Unit divisible into Q Coding Units, said units being further divisible into K lower Prediction Units, wherein, for a Largest Coding Unit of said lower layer which is not divided into smaller Coding Units and which has lower Prediction Units of different sizes, said at least one part of said enhancement layer is divided into K subdivisions having substantially equivalent proportions as the lower Prediction Units of different sizes.

18. An encoding device for scalable encoding of a digital image into a base layer and at least one enhancement layer comprising:

a memory;

a processor coupled to the memory which executes the following:

an up-sampling step configured to provide at least one part of an enhancement layer, based on a corresponding part of a lower layer having a lower level than the considered enhancement layer, the area of said corresponding parts having a scale factor of $4^p$ (p≥1), the lower layer comprising at least one Largest Coding Unit divisible into Q Coding Units, said units being further divisible into K Prediction Units, the up-sampling unit comprising a dividing step configured to divide into K subdivisions the corresponding part of said enhancement layer, when a Largest Coding Unit of said lower layer is not divided into smaller Coding Units and has lower Prediction Units of different sizes, said K subdivisions having substantially equivalent proportions as the lower Prediction Units of different sizes.

19. A decoding device for scalable decoding of an encoded digital image including a base layer and at least one enhancement layer, said device comprising:

a memory;

a processor coupled to the memory which executes the following:

an up-sampling step configured to provide at least one part of an enhancement layer, based on a corresponding part of a lower layer having a lower level than the considered enhancement layer, the area of said corresponding parts having a scale factor of $4^p$ (p≥1), the lower layer comprising at least one Largest Coding Unit divisible into Q Coding Units, said units being further divisible into K Prediction Units, the up-sampling unit comprising a dividing step configured to divide into K subdivisions the corresponding part of said enhancement layer, when a Largest Coding Unit of said lower layer is not divided into smaller Coding Units and has lower Prediction Units of different sizes, said K subdivisions having substantially equivalent proportions as the lower Prediction Units of different sizes.

* * * * *